Aug. 14, 1945.  R. W. BLAKE  2,382,377
LIQUID LEVEL INDICATOR
Filed March 5, 1941
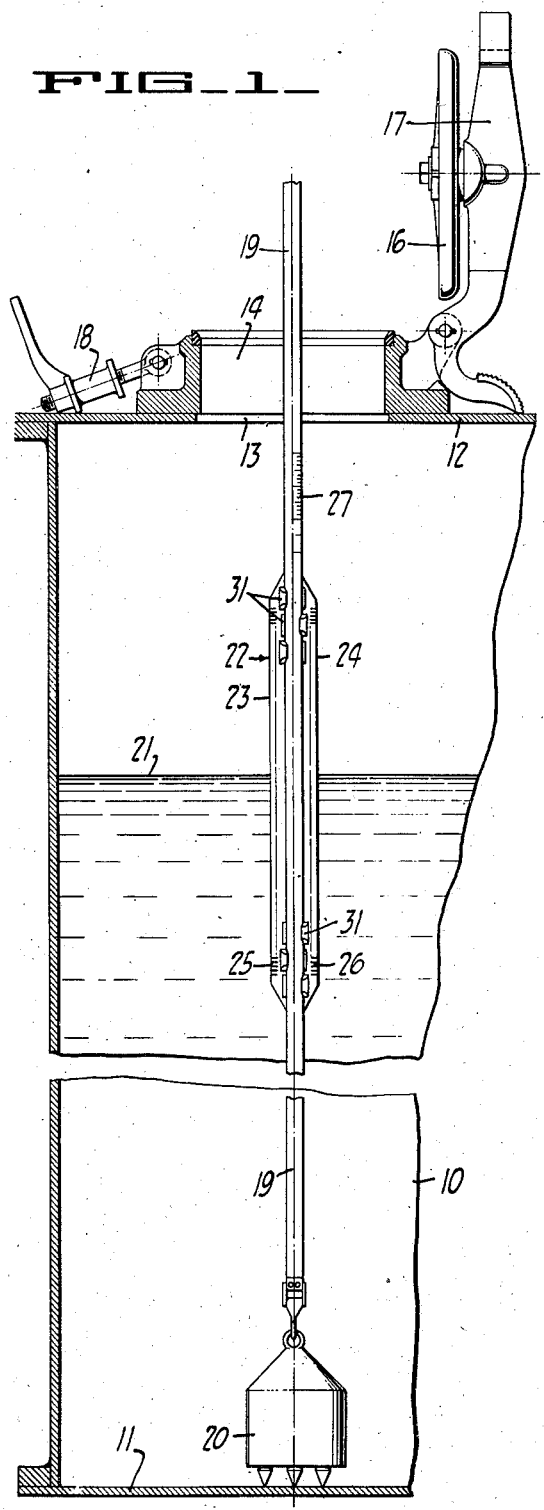
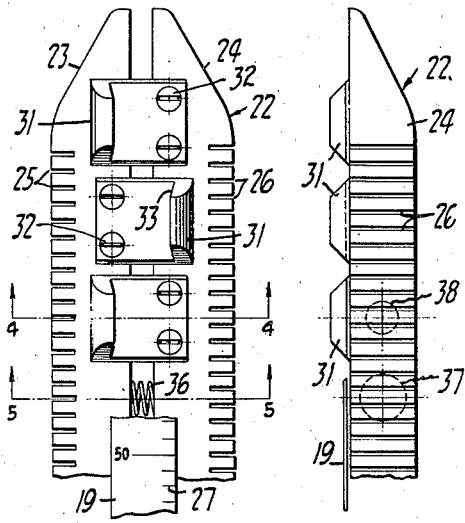
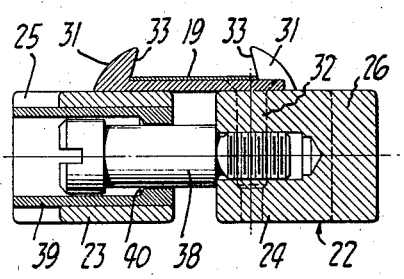
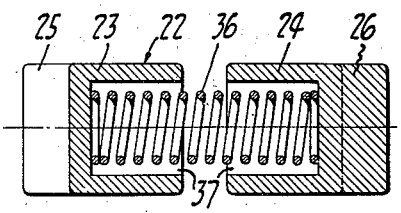
INVENTOR
Robert W. Blake
BY Paul O. Flehr
ATTORNEY Patented Aug. 14, 1945

2,382,377

UNITED STATES PATENT OFFICE 2,382,377

LIQUID LEVEL INDICATOR

Robert W. Blake, Chicago, Ill., assignor to Shand & Jurs Company, a partnership composed of Albert E. Jurs, Raymond M. Young, Peter C. Jurs, and Eugene E. Jurs Application March 5, 1941, Serial No. 381,778

2 Claims. (Cl. 33—126.7)

This invention relates generally to indicating apparatus for use with liquid storage tanks, and is concerned more particularly with the provision of improved means for enabling quick and accurate reading of the liquid level in a tank.

It is a general object of the invention to provide an improved liquid level indicator for accurate reading of the height of liquid in a tank.

Another object of the invention is to provide a portable indicating member which can be readily and easily attached to a flexible tape or the like in a selected adjusted position.

Other objects and advantages of the invention will be apparent from the following description of certain preferred embodiments thereof, as shown in the accompanying drawing, in which:

Figure 1 is a fragmentary sectional elevational view of an indicating apparatus constructed in accordance with the instant invention in place in a liquid storage tank.

Figure 2 is an enlarged elevational view of an end of the liquid level indicating plate illustrating one method for quick selective attachment thereof to its supporting element.

Figure 3 is a fragmentary side elevational view of the end of the indicator plate shown in Figure 2.

Figure 4 is a sectional view of the indicator plate taken in a plane indicated by the line 4—4 in Figure 2.

Figure 5 is a sectional view taken in a plane indicated by the line 5—5 of Figure 2.

In gauging the amount of liquid in a liquid storage tank, it is customary to extend an elongated flexible element such as a graduated tape into the tank until a weight or plomb bob carried at the lower end of the tape is resting on the bottom of the tank, so that the height of the liquid from the bottom of the tank to the liquid surface or level is indicated. Usually, it is customary to employ paste, chalk, or the like on the tape so that the extent of wetting of the tape can be readily observed to obtain a reading of the upper surface level. These methods of indicating the extent of the wetting of the tape by the liquid are more or less unsatisfactory because of several disadvantages, for example creeping of the liquid along the tape, or receding of the liquid from its highest level on the tape.

In accordance with the instant invention, the above and other disadvantages are overcome by providing an accurate reliable indicator plate or element of a portable character which can be quickly attached or removed from the tape at any selected adjusted position thereon in accordance with the level of liquid in the tank, so that an accurate and reliable reading can be taken.

Referring to Figures 1 to 5, the apparatus illustrated consists of a tank 10 having a bottom wall 11 and a top wall 12. Access can be had to the tank through an opening 13 in the top wall 12 with which a suitable hatch construction is associated. The hatch may include a body 14 having an annular seat for engagement by a closure disc 16. Disc 16 is carried by a pivoted clamping lever 17 which may be engaged by a suitable clamping device 18 to hold the closure disc in place.

In order to gauge the amount of liquid in the tank, an elongated gauging element in the form of a graduated tape 19 is provided which is adapted to extend down into the tank until a plomb bob 20 carried at the lower end of the tape 19 engages the bottom wall 11. When this condition is obtained and with the tape taut, the graduations on the tape 19 will correctly read the distance from the bottom wall of the tank to the level 21 of the liquid in the tank.

In order to enable accurate reading of the actual extent of wetting of the tape 19 by the liquid and therefore an accurate reading of the amount of liquid in the tank, a liquid level indicating device is provided in the form of an indicating plate or stick 22 made in two similar sections 23 and 24 of elongated character. As seen most clearly in Figure 2, the side edges of the respective strip sections 23 and 24 are provided with respective series of liquid receiving openings in the form of transverse grooves 25 and 26. The grooves 25 and 26 in each series are spaced equally apart and the two series are staggered with respect to each other. Preferably the spacing between the grooves corresponds to the spacing between the graduations 27 and the tape 21.

The indicator plate 22 is preferably of a portable character and is adapted for clamping engagement on the tape 19 in a selected adjusted position in accordance with the level of liquid in the tank, so that the liquid level will be located in the intermediate grooved portion of the plate. In this way a part of the indicating grooves 25 and 26 will be filled with liquid, thereby indicating the surface or level of the liquid at the topmost groove which is filled. Such indicating grooves have been known prior to my invention (see publication entitled "Instruction for Measuring, Sampling and Testing Shipments" by Standard Inspection Laboratory).

Referring to Figures 1 to 5, the respective sections 23 and 24 of the indicator are provided with tape-engaging lugs or fingers 31 detachably secured thereon by counter-sunk screws 32. As seen in Figure 1, two groups of lugs 31 may be provided. The base of each lug 31 extends across the gap between the sections 23 and 24 and is provided with an upright finger portion having an inclined tape-engaging surface 33. Lugs 31 on section 23 face lugs 31 on section 24 so that as the sections move together the lugs are separated and as the sections are moved apart the lugs close together, and will engage the opposite edges of the tape. As seen in Figure 1, two lugs 31 are provided at the upper end of section 24 at either side of a single lug 31 on section 23. At the lower end of the sections, the reverse situation is true, there being two lugs on section 23 and one lug on section 24.

Sections 23 and 24 of the indicator are spring-urged apart by a plurality of compression springs 36 seated in opposed recesses 37 of the sections (see Figure 5). To limit separating movement of the sections, a plurality of studs 38 (Figure 4) are provided. Each stud 38 is threaded in one of the sections and has its head slidably disposed in a sleeve 39 secured in the opposite section as by a press-fit. Sleeve 39 is provided with a shoulder 40 providing a stop for engagement with the head of the stud.

In use the sections 23, 24 of the indicator plate are pressed together, compressing springs 36 and separating lugs 31. The indicator plate is then placed on the tape in the desired position so that sections 23 and 24 separate under the action of springs 36 to engage lugs 31 firmly with the edges of the tape.

From the above description it is seen that a quick, detachable snap-on fastening device is provided for securing the indicating plate 22 on the elongated gauging element or tape 19. In this way the indicating plate can be quickly attached to the tape in a desired position for accurate reading of the upper surface level of the liquid in the tank. Also, because of the portable character of the grooved indicator plate, it can be used with a plurality of tapes or gauging elements at a plurality of tanks.

In the foregoing description, the embodiment illustrated has made use of grooves or openings for the purpose of indicating the liquid level. In place of such grooves or openings, other liquid indicating expedients can be employed, such as a strip of indicating paper, chalk, paste, and the like. Also the plate or stick 22 can serve as a mounting for devices such as a cup thermometer, which one may wish to partially immerse in the liquid.

I claim:

1. Indicating means for quick attachment to an elongated gauging element for liquid storage tanks, said indicating means comprising a device made of at least two sections, spring means interposed between said sections urging them apart, and gripping lugs on each of said sections for engaging the edge of the elongated gauging element, the lugs of each section overlapping the opposite section, whereby the lugs are urged together by the spring means urging the sections apart, the element-engaging surfaces of said lugs being inclined to cause gripping of the element at the base of the lugs.

2. An indicator for quick attachment to, and lengthwise adjustment along, an elongated gauging element of the kind which is adapted to be employed in connection with the measuring of liquid in a container, said indicator comprising companion, elongated sections arranged in side-by-side relation, a plurality of gripping elements spaced along said sections for supporting said sections as a unit on said gauging element lengthwise of, adjacent, and in parallel relation with respect to, the latter, whereby said unit may be partially immersed in said liquid to indicate the level thereof, certain of said gripping elements being fixed to each of said sections and overlapping the other section, resilient means for urging said sections apart, said elements having portions which, by the action of said resilient means on said sections, are caused to engage opposite sides of said gauging element in such a manner as to prevent detachment of said indicator except by the movement of said sections toward one another against the action of said resilient means.

R. W. BLAKE.